United States Patent
Purdy et al.

(10) Patent No.: US 11,898,092 B2
(45) Date of Patent: Feb. 13, 2024

(54) COMPOSITION USEFUL IN SULFATE SCALE REMOVAL

(71) Applicant: FLUID ENERGY GROUP LTD., Calgary (CA)

(72) Inventors: Clay Purdy, Medicine Hat (CA); Markus Weissenberger, Calgary (CA); Stig Magnor Nordaa, Sandnes (NO); Elsayed Abdelfatah, Calgary (CA)

(73) Assignee: DORF KETAL CHEMICALS FZE

( * ) Notice: Subject to any disclaimer, the term of this patent is extended or adjusted under 35 U.S.C. 154(b) by 0 days.

(21) Appl. No.: 17/714,709

(22) Filed: Apr. 6, 2022

(65) Prior Publication Data

US 2022/0325167 A1    Oct. 13, 2022

(30) Foreign Application Priority Data

Apr. 9, 2021   (CA) ...................................... 3114487

(51) Int. Cl.
*C09K 8/528*   (2006.01)
*C09K 8/584*   (2006.01)

(52) U.S. Cl.
CPC .............. *C09K 8/528* (2013.01); *C09K 8/584* (2013.01)

(58) Field of Classification Search
None
See application file for complete search history.

(56) References Cited

U.S. PATENT DOCUMENTS

| 3,625,761 | A | 12/1971 | Tate |
| 3,660,287 | A * | 5/1972 | Quattrini ................. C23G 1/24 166/305.1 |
| 4,030,548 | A | 6/1977 | Richardson et al. |
| 4,708,805 | A * | 11/1987 | D'Muhala ................ C02F 5/12 210/698 |
| 4,980,077 | A | 12/1990 | Morris et al. |
| 5,084,105 | A | 1/1992 | Morris et al. |
| 7,470,330 | B2 | 12/2008 | Keatch |

FOREIGN PATENT DOCUMENTS

WO    1993024199 A1    12/1993

OTHER PUBLICATIONS

JP 2015529691-A; Published Oct. 8, 2015 (Year: 2015).*
Ramanathan, Raja Subramanian, Improving the Dissolution of Iron Sulfide by Blending Chelating Agents and its Synergists, Publisher: Society of Petroleum Engineers (SPE), Paper presented at the SPE Middle East Oil and Gas Show and Conference, Mar. 18-21, 2019 Paper No. SPE-195128-MS; (Year: 2019).*

* cited by examiner

*Primary Examiner* — Charles R Nold
(74) *Attorney, Agent, or Firm* — Blank Rome LLP

(57) ABSTRACT

The present invention discloses a novel aqueous composition for use in removing petroleum-contaminated barium sulfate scale from a surface contaminated with such, said composition comprising: a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; a scale removal enhancer; a non-ionic surfactant; and a hydrotrope. There is also disclosed methods to use such compositions.

11 Claims, 3 Drawing Sheets

COMPOSITION USEFUL IN SULFATE SCALE REMOVAL

FIELD OF THE INVENTION

The present invention is directed to a composition for use in energy production operations, more specifically to compositions used in the removal of petroleum-contaminated barium sulfate scale.

BACKGROUND OF THE INVENTION

Scaling, or the formation and consequent deposition of mineral deposits can occur on surfaces of metal, rock, or other materials. Scale is caused by a precipitation process as a result of a change in pressure and temperature and the subsequent change in the composition of a solution (commonly water) and is also commonly observed due to incompatibilities of seawater and formation water. Sulfates in the injected seawater react with naturally occurring barium in the formation water to induce barium sulfate scale.

Typical scales consist of e.g. calcium carbonate, calcium sulfate, barium sulfate, strontium sulfate, iron sulfide, iron oxides, or iron carbonate.

In some cases, scale deposits restrict or even shut-off the production conduit if the produced water composition flow path is severely affected by a change in pressure and/or temperature due to wellbore equipment, such as downhole chokes or flow-controls. In addition to produced formation water scaling issues due to the mineral content, also other sourced water utilized in well operations can be potential sources of scaling minerals, including water utilized in water flood or injection operations or geothermal operations and associated down hole and surface equipment.

The precipitation of sulfate scales can occur at any point in production, injection, or disposal well cycle, and can also be caused by incompatibilities of injected water and formation water, in addition to the changes in temperature and pressures mentioned above, as well as wellbore additives or upsets in the flow equilibrium. Scale on surface equipment (e.g. heat exchangers, piping, valves, flow-control devices) are also a catalyst for sulfate scales. In offshore oil & gas operations, seawater is often injected into reservoirs for pressure maintenance, and as seawater has a high content of sulfate ions and formation water or drilling fluids often have a high content of barium, calcium, and/or strontium ions stripped from the formation, mixing these waters causes sulfate mineral precipitation. Sulfate scaling on surface equipment, such as heat exchangers and the associated piping, is a major issue for industry as well as it typically needs to be managed by mechanical means such as disassembling the equipment in question, manually cleaning the scale and reassembling is very time consuming and expensive and, in some cases, causes operations or production to cease, further adding to the associated costs. Having a chemical solution that can treat these sulfate scales with minimal agitation and at lower temperatures would be very advantageous for industry. As the multiple sulfate composition scaling challenges occur offshore and onshore are typically very difficult to manage efficiently as a whole. Having a sulfate dissolver that solubilizes all typical scales encountered either individually or as a composition is advantageous for the industry versus having to deploy specific chemistry for each type of scale or manage the scaling issues with mechanical means.

The most obvious way of preventing a scale from forming during production is to prevent the super saturation of the brine being handled, although not always possible, and manage the flow path of fluids to minimize pressure, temperature and rate differentials. This may sometimes be possible by altering the operating conditions of the reservoir, for example by ensuring that the wellbore pressure is sufficient to prevent the liberation of gas and by injecting water which is compatible with formation water. However, the economics usually dictate that the use of inhibitors or batch treating any precipitated scale is preferred to manage costs.

Controlling scale with the use of inhibitors as well as understanding and mitigating scaling tendencies is important for both production and injection wells along with associated water treatment infrastructure, as well as also having a solution or economical means of treating any scaling that does occur, even after best practices have been implemented during the production cycle.

The design of scale treatment programs requires extensive knowledge of scaling/chemistry theory and a broad base of practical operational experience to be successful. Applications occasionally present themselves in which the ideal selection and thus compatibilities of chemicals and fluids may be beyond the scope of a wellsite engineer's experience or theoretical knowledge. Rules of thumb and general formulas may not be adequate to achieve success. Selection procedures based on broader experience and more in-depth knowledge may be required. Analysis of deposits and dissolver screening ideally should be performed when considering a potential scale dissolving application, therefore the scale that is causing the "operational challenges" will have to be analyzed.

The most common sulfate scales are barium, calcium, and strontium. These alkaline earth metal salts have many similar properties and often precipitate in conjunction forming problematic and integrated sulfate scales. In some cases, they are also comingled with other common scales such as calcium carbonate and or iron-based examples. The deposition of barium scale, in particular, is a serious problem for oil and gas producers globally, causing fouling in the wellbore resulting in reduced or lost production and surface-related processing equipment also resulting in a loss or reduction of revenue. These scales not only restrict the hydrocarbon flow from the formation resulting in lost production, and since the formation or injection water is saturated with sulfates, the continued deposition causes fouling and potential failures of critical equipment such as perforations, casing, tubes, valves, and surface equipment, all with the potential to reduce the rate of oil production and result in substantial lost revenue. There is a need in the industry for an effective solution to this ongoing challenge. Sulfate scales such as radium sulfate, barium sulfate, calcium sulfate etc.—are sometimes referred to as NORM scale due to their solubility characteristics—typically 0.0023 g/l in water—are more difficult to deal with than carbonate scales. Sulfate scales are not soluble in traditional acid scale dissolvers. Radium sulfate, while not being the most common sulfate scale represents a challenge in its removal as it is often embedded in barium sulfate scale and is also radioactive and thus can carry an exposure risk and cause very expensive clean-up or disposal costs of tubing and down-hole equipment etc. when brought out of the well during a workover, general service or abandonment. Having a chemical that can be used to wash these components while still in the well and effectively clean/remove the NORM materials leaving them down-hole, allowing the operator to greatly reduce handling/disposal costs related to NORM-containing wells is very advantageous.

Once this water-insoluble scale has formed, it is extremely difficult to remove with existing chemical options on the market and is typically dealt with mechanically or by a complete replacement of affected equipment.

The solubility of barium sulfate is reported to be approximately 0.0002448 g/100 ml (20° C.) and 0.000285 g/100 ml (30° C.). Existing methods to remove sulfate scale include mechanical removal and/or low-performance scale dissolvers currently on the market, but both have limitations and disadvantages. Mechanical removal involves the use of milling tools, scrapers, or high-pressure jetting, and/or disassembly of key production equipment causing substantial down time of production and processing equipment. These methods have limited efficiency as the scale is extremely hard to remove, often forming in areas beyond the reach of the mechanical equipment as many facilities have welded joints and limited access. High pressure jetting will typically only remove the surface of the scale.

Sulfate scale dissolvers were developed to overcome the low solubility of these types of scale. Sulfate scale dissolvers work by chelating or coordinating the dissolved sulfate present in the water allowing it to be dissolved. To assist the rate of reaction or increase the speed and efficiency of dissolution, these products are typically deployed at elevated temperatures of 50° C. to 90° C. but can show effectiveness at temperatures of up to 170° C. Sulfate scale dissolution will as a result take far longer than for example carbonate scale dissolution in and acid as there is an immediate and rapid reaction occurring, unlike with common sulfate scale dissolvers. Typical scale dissolvers such as ethylenediaminetetraacetic acid (EDTA), and variations of this molecule (such as diethylenetriaminepentaacetic acid DTPA) are used by the industry to dissolve sulfate scale with some limited success, and sequestering the barium, calcium, and strontium ions. However, this process is time-consuming, requires higher temperatures (usually above 75° C.), agitation, and has limited dissolution capacity per gallon.

The following include some patent disclosures of sulfates scale removers. U.S. Pat. No. 4,980,077 A demonstrates that alkaline earth metal scales, especially barium sulfate scale deposits can be removed from oilfield pipe and other tubular goods with a scale-removing composition comprising an aqueous alkaline solution having a pH of 8 to 14, a polyaminopolycarboxylic acid, preferably EDTA or DTPA, and a catalyst or synergist comprising an oxalate anion. It is stated that when the scale-removing solution contacts a surface containing a scale deposit, substantially more scale is dissolved at a faster rate than previously possible.

PCT patent application WO 1993024199 A1 demonstrates the use of low-frequency sonic energy in the sonic frequency range to enhance the dissolution of alkaline earth metal scales using a scale-removing solvent comprising an aqueous alkaline solution having a pH of 8 to 14 and containing EDTA or DTPA and a catalyst or synergist, preferably an oxalate anion. It is stated that when the scale-removing solvent contacts the surface containing a scale deposit while simultaneously transmitting low-frequency sonic energy through the solvent, substantially more scale is dissolved at a faster rate than previously possible.

U.S. Pat. No. 4,030,548A demonstrates a barium sulfate scale (or solid) can be dissolved economically by flowing a stream of relatively dilute aqueous solution of aminopolyacetic acid salt chelating agent into contact with and along the surfaces of the scale while correlating the composition and flow rate of the solution so that each portion of solution contains an amount of chelant effective for dissolving barium sulfate and the upstream portions of the scale are contacted by portions of the solution which are unsaturated regarding the barium-chelant complex.

U.S. Pat. No. 3,625,761A demonstrates a method of removing a deposit of alkaline earth metal sulfate scale in an aqueous system which comprises contacting said scale deposit with a treating composition heated to a temperature in the range of 86 to 194° F. consisting essentially of an aqueous alkaline solution containing 4 to 8 percent by weight of disodium hydrogen ethylenediaminetetraacetate dihydrate and having a pH in the range of 10 to 13 for a period sufficient to dissolve at least some of the said scale, acidifying said solution to decrease the pH thereof to a pH in the range of 7 to 8 with an acid selected from the group consisting of sulfuric acid, hydrochloric acid, oxalic acid, a mixture of sulfuric acid and oxalic acid, and a mixture of hydrochloric acid and oxalic acid, to precipitate any alkaline earth metal ion present.

U.S. Pat. No. 5,084,105A demonstrates that alkaline earth metal scales, especially barium sulfate scale deposits can be removed from oilfield pipe and other tubular goods with a scale-removing composition comprising an aqueous alkaline solution having a pH of 8 to 14, preferably 11 to 13, of a polyaminopolycarboxylic acid, preferably EDTA or DTPA and a catalyst or synergist comprising a monocarboxylic acid, preferably a substituted acetic acids such as mercaptoacetic, hydroxyacetic acid or aminoacetic acid or an aromatic acid such as salicylic acid. The description states that when the scale-removing solution is contacted with a surface containing a scale deposit, substantially more scale is dissolved at a faster rate than is possible without the synergist.

U.S. Pat. No. 7,470,330 B2 demonstrates a method of removing metal scale from surfaces that includes contacting the surfaces with first an aqueous solution of a chelating agent, allowing the chelating agent to dissolve the metal scale, acidifying the solution to form a precipitant of the chelating agent and a precipitant of the metal from the metal scale, isolating the precipitant of the chelating agent and the precipitant of the metal from the first solution, selectively dissolving the precipitated chelating agent in a second aqueous solution, and removing the precipitated metal from the second solution is disclosed. This is understood to be a multi-step process which would cause longer shutdown in production and is not determined to actually be applicable in the field.

Crude oil or petroleum is generally identified by the content of various hydrocarbons therein. The first class of compounds making up petroleum are paraffins. These are the most common hydrocarbons in crude oil. The second class of compounds making up petroleum are naphthenes. The third class of compounds making up petroleum are aromatics but these represent only a small percentage of the total petroleum extracted. During production, the accumulation of barium scale within tubing where petroleum flows will restrict the flow and may, if unchecked, completely block the flow in some cases. The removal of barium sulfate scale, as discussed above, requires shut down of production and depending on the situation may take several hours to several days to re-establish sufficient flow to re-initiate production.

Despite the existing prior art, there are very few commercially successful compositions available to remove barium sulfate scale, the situation is made even more complex since most barium sulfate scale occurs in wellbores, pipes and other equipment associated with either oil production and/or oil exploration. Thus, the removal of petroleum-contaminated barium sulfate scales presents an even more challenging task for operators.

When sulfate scale is co-mingled/coated/covered with a petroleum-based product, it is understood to be contaminated by such. Petroleum contamination makes the scale surface hydrophobic and therefore the common aqueous descaling/chelating compositions have substantially more difficulty interacting or contacting the barium sulfate scale due to this barrier. Consequently, this petroleum contamination dramatically reduces the efficiency of the scale dissolver.

There thus exists a profound and commercial need for compositions and methods capable of removing very difficult to remove petroleum-contaminated or coated barium sulfate scales present on equipment involved in oilfield operations.

SUMMARY OF THE INVENTION

According to the first aspect of the present invention, there is provided an aqueous composition for use in removing petroleum-contaminated barium sulfate scale from a surface contaminated with such, said composition comprising:
a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
a scale removal enhancer;
a hydrotrope; and
a non-ionic surfactant.

Preferably, the hydrotrope is selected from the group consisting of: alkyl glucoside and alkyldiphenyloxide disulfonate.

According to another aspect of the present invention, there is provided a method of removing petroleum-contaminated barium sulfate scale, said method comprising the steps of:
providing a liquid composition comprising:
a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
a scale removal enhancer;
a non-ionic surfactant; and
a hydrotrope;
exposing a surface contaminated with barium sulfate scale to the liquid composition; allowing sufficient time of exposure to remove the petroleum-contaminated barium sulfate scale from the contaminated surface.

According to another aspect of the present invention, there is provided an aqueous composition for use in removing petroleum-contaminated barium sulfate scale from a surface contaminated with such, said composition comprising:
a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; and
a scale removal enhancer;
a non-ionic surfactant; and
a hydrotrope.

Preferably, the hydrotrope is selected from the group consisting of: alkyl glucoside and alkyldiphenyloxide disulfonate.

Preferably, the scale removal enhancer is selected from the group consisting of: potassium carbonate; potassium formate; cesium formate, cesium carbonate, and combinations thereof. Preferably, the scale removal enhancer is present in the composition in an amount ranging from 5 to 20 wt % of the composition. More preferably, from 10 to 15 wt % of the composition. Also preferably, the scale removal enhancer is present in the composition in an amount of approximately 10 wt % of the composition.

Preferably, the chelating agent and counterion are present in the composition in an amount ranging from 5 to 40 wt % of the composition. More preferably, from 10 to 30 wt % of the composition. Also preferably, the chelating agent and counterion are present in the composition in an amount ranging from 10 to 20 wt % of the composition.

According to the preferred embodiment of the present invention, the concentration of the surfactant ranges between 0.1 wt % to 3.0 wt % of the composition. Preferably, the concentration of the surfactant does not exceed 2 wt % as it is progressively more difficult to dissolve such at a basic pH. Preferably, the pH of the composition ranges from 10 to 11.

According to the preferred embodiment of the present invention, the hydrotrope can be selected from the group consisting of: alkyl glucoside, alkyldiphenyloxide disulfonate, sodium xylene sulfonate, or sodium cumene sulfonate. Preferably, for sodium xylene sulfonate and sodium cumene sulfonate the concentration ranges from 1-15 wt % of the composition. Preferably, the concentration of the sodium xylene sulfonate and sodium cumene sulfonate is 10 times the concentration of the nonionic surfactant. Preferably, the concentration of the alkyl glucoside or alkyldiphenyloxide disulfonate ranges between 0.1 wt % to 5.0 wt %. Preferably, the concentration of the alkyl glucoside is 5 times the concentration of the nonionic surfactant.

BRIEF DESCRIPTION OF THE FIGURES

Features and advantages of embodiments of the present application will become apparent from the following detailed description and the appended figures, in which.

DETAILED DESCRIPTION OF A PREFERRED EMBODIMENT

Figure 1:
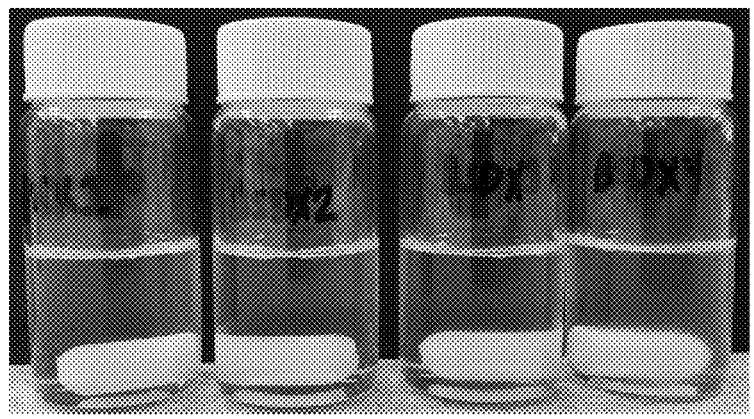
FIG. 1 is a photograph showing Lutensol® XL90 dissolved in a barium scale dissolver (base BSD) with TRITON™ H55.

The inventors have previously noted that chelating agents such as EDTA (Ethylenediaminetetraacetic acid) or DTPA (diethylenetriaminepentaacetic acid) can dissolve non-contaminated barium sulfate depending substantially on the size and ion strength of the counterion.

Tests performed have indicated that besides the nature of the counterion, an excess of the counterion also improves the solubility. $K_5$DTPA was tested in conjunction with KCl, $K_2CO_3$, and KOOCH (potassium formate). It seems that the counterion also plays a large role as $K_2CO_3$ (with the larger anion) was much more effective than KCl (with a small anion).

By the addition of potassium carbonate to $K_5$DTPA, the same solubility numbers can be attained at a lower pH. Instead of 13.5, a pH of 11 was sufficient to obtain comparable solubility numbers. This represents a considerable difference. This allows to conduct scale removal operations at a lower pH and therefore increases the safety for the personnel handling the remover or anyone in the surrounding area.

According to a preferred embodiment of the present invention, a composition for removing or mitigating petroleum-contaminated barium sulfate scale comprises a chelating agent, $K_5$DTPA and a scale removal enhancer, $K_2CO_3$ along with a non-ionic surfactant.

According to a preferred embodiment of the present invention, the petroleum-contaminated barium sulfate scale removing composition provides improved rates of scale dissolution. This, in turn, reduces the down time for wells where the scale is being removed. It also reduces the cost of such treatment by limiting the treatment time.

Previous testing has shown the inventors that the compositions tested for removing non-contaminated barium sulfate scale permits the removal thereof at a much lower pH than what has been practiced to date. Indeed, such a composition can effectively remove the barium scale under conditions where the pH is 11, rather than other scale removal compositions which require conditions where the pH is 13. A preferred composition according to the present invention may remove up to 30 kg/m$^3$ of non-contaminated $BaSO_4$ scale with a pH of 10. When using the term "non-contaminated $BaSO_4$ scale", it should be understood to the person skilled in the art, that the barium sulfate scale is not contaminated by a petroleum product or a petroleum-based product.

According to a preferred embodiment of the present invention, a composition for removing petroleum-contaminated barium sulfate scale permits the removal thereof with a higher dissolution capacity. This, in turn, allows reducing the volume of scale remover necessary. This also decreases transport costs and many other related items resulting from the usage of lower volumes of scale remover.

According to a preferred embodiment of the present invention, a composition for removing petroleum-contaminated barium sulfate scale permits the removal thereof at lower temperature and pH than other barium sulfate scale removing chemistry. This results in safer treatment conditions for individuals involved in this process, along with reduced transportation, storage and logistical challenges associated with high pH chemistry.

According to a preferred embodiment of the present invention, a composition for removing petroleum-contaminated barium sulfate scale comprises a non-ionic surfactant. Alcohol ethoxylate-based surfactants are preferably used in the present invention because of their non-ionic character. However, alcohol ethoxylates are not water-soluble at a pH of 10 to 11 as the high pH stretches ethylene oxide chains exposing their hydrophobic backbone. A hydrotrope is required to solubilize alcohol ethoxylate-based surfactants at a pH of 10 to 11. Examples of alcohol ethoxylate-based surfactant include, but are not limited to: aromatic ethoxylates and branched or linear ethoxylates of the following formula: $H_3C-(CH_2)_m-(OC_2H_4)_nOH$ where m is between 6 and 12 and n is between 8 and 16, preferably m is 9 and n is between 9 to 14.

Preparation of a Base BSD Composition

To prepare a base BSD (barium scale dissolver) composition, combine 334 g of distilled water with 300 g of potassium hydroxide (40% (w/v)) solution and 197 g of diethylenetriamine pentaacetate. Mix thoroughly. Measure 500 mL of the base solution and add 500 mL of distilled water with 50 g of potassium carbonate and 4 mL of XL 90. Mix thoroughly.

Lutensol® surfactants are ethoxylates of alkyl polyethylene glycol ethers based on the C10-Guerbet alcohol. They are non-ionic surfactants. The Lutensol™ XL BASF $C_{10}$-Guerbet Alcohol used for the experiments can be better described as follows: the chemical formula is $C_5H_{11}CH(C_3H_7)CH_2OH$ with the restriction that for 70-99 weight % of compound $C_5H_{11}$ means n-$C_5H_{11}$ and for 1-30 weight % $C_5H_{11}$ means $C_2H_5(CH_3)CH_2$ and/or $CH_3CH(CH_3)CH_2CH_2$. Produced by BASF via dimerization of slightly branched C5-aldehyde via aldol reaction followed by hydrogenation.

Laboratory Testing of Scale Dissolution

The sample selected for the solubility testing origins from an oilfield tubular containing sulfate scale crystals originally used for demonstration purposes. Crystals of non-contaminated barium sulfate scale were removed from the tubular to be used for the solubility testing. 200 mL of the composition ($K_5$DTPA 20 wt % and 5 wt % $K_2CO_3$) was used. A weighed portion of the oilfield sulfate scale sample was submerged in 200 mL of each de-scaling composition. A small magnetic stirrer is added to create a very minimal vortex, creating a small movement of fluid without rigorously stirring the fluid. The fluid was heated to 70° C.

Results 25.165 grams of non-contaminated oilfield sulfate scale was weighed and added to the fluid. The stirrer and heater were started. After 1 hour a slight colouring of the fluid was observed. After 4 hours at temperature when no continued visual reduction of the scale was observed, the fluid was filtered and the filter rinsed with water, dried and weighted. The maximum scale solubility was reached and subsequently calculated.

The base barium scale dissolver composition (used in later testing and referred to as "base BSD") comprises a 20 wt % solution of $K_5$DTPA and 5 wt % $K_2CO_3$. The base BSD was able to dissolve 52.97 grams per litre of scale at 70° C. The testing was also carried out with a commercially available product (Barsol NS™), which is alkali/EDTA based and with EDTA. The Barsol NS™ product was capable of dissolving 24.19 grams per litre. While EDTA alone only dissolved around 6 grams per litre. Under identical conditions, base BSD was shown to have more than double the performance of Barsol NS™.

Extent of Dissolution of Petroleum-Contaminated Barium Scale

In order to assess the extent and efficacy of barium sulfate scale dissolvers according to preferred embodiments of the present invention, testing using petroleum-contaminated barium sulfate was carried out. The dissolution of barium sulfate contaminated with petroleum products to mimick the real-life situations encountered in the oilfield was studied by comparing a barium sulfate dissolver (the base BSD) to various preferred compositions according to the present invention (base BSD with Lutensol™XL 90, base BSD with Lutensol™XL 100, and base BSD with Lutensol™XL 140).

The preparation of contaminated petroleum involved the following: use 10 g of lab grade 98% pure Barium Sulfate and add to that 3 g of a low viscous crude oil into a beaker. The ingredients were mixed with a stir rod until a homogenous, dry, powdered mixture was achieved. The mixture was allowed to sit for 24 hours.

The amount of liquid used was 100 ml to which was added 0.25 g of contaminated $BaSO_4$. Therefore, the 1500 mg/L Ba below is just the maximum of available Ba under these experimental conditions and not a maximum for the barium sulfate scale dissolver. This experiment shows that the solubility is improved and the oil layer can be successfully removed, it was not designed as a measure of the extent of dissolution of barium sulfate scale by the barium scale dissolver with surfactant.

The results of the analysis of the solution were done by atomic spectroscopy which analyzed the amount of barium dissolved in the solution are listed in Table 1 below.

TABLE 1

Elemental analysis of dissolved barium by Atomic Spectroscopy

| Lab Filtered Elements | UNITS | Base BSD | Base BSD with XL 90 | Base BSD with XL 100 | Base BSD with XL 140 |
|---|---|---|---|---|---|
| Dissolved Barium (Ba) | mg/L | 1100 (1) | 1500 (1) | 1500 (1) | 1500 (1) |

RDL = Reportable Detection Limit
(1) Detection limits raised due to dilution to bring analyte within the calibrated range.

Moreover, the compositions according to the present invention used are quite environmentally safe. This represents a major advantage over any known chemically-based methods of the removal of petroleum-contaminated barium scale. Another advantage to the compositions according to preferred embodiments of the present invention includes the speed of dissolution which is considerably faster than any known commercial compositions. Another advantage of preferred compositions according to the present invention is that they can be employed on wells according to a one-step process and thus are very desirable to operators which deal with petroleum-contaminated barium sulfate scale issues.

Base BSD is a high alkaline and chelating agent solution used for dissolving barium sulfates scales. It is a mixture of KOH and DTPA.

In general, nonionic alkoxylated alcohols surfactants are not soluble in high alkaline high chelating agents' solutions. However, nonionic alkoxylated alcohols such as Lutensol® XL90 are very effective wetting and emulsifying agents.

To dissolve Lutensol™ XL90 in such solutions, several hydrotropes such as sodium xylene sulfonates (SXS), sodium cumene sulfonates (SCS), ethanol, and $C_6$-alkyl glucoside can be used (Ref. US 2005/0215462 A1). Alkyldiphenyloxide disulfonate is another effective hydrotrope for high alkaline solutions. It is noted that SXS and ethanol are only effective when using a very low concentration of nonionic alkoxylated alcohols surfactants.

Phosphate polyether ester hydrotropes such as TRITON™ H-55 are chemically stable in acidic & alkaline solutions. However, they do not work at very high alkaline or in the presence of chelating agents.

It was unexpectedly found that relatively low dosage $C_6$-alkyl glucoside, $C_8$-alkyl glucoside, $C_8$-$C_{10}$-alkyl glucoside, or alkyldiphenyloxide disulfonate can dissolve higher concentrations of nonionic alkoxylated alcohols high alkaline high chelating agents' solutions compared to other hydrotropes such as SXS and SCS.

Observations

TRITON™ H-55

Phosphate polyether ester hydrotropes such as TRITON™ H-55 are chemically stable in acidic & alkaline solutions. TRITON™ H-55 is soluble in base BSD at all the concentrations tested in Table 2. However, none of these concentrations of TRITON™ H-55 can dissolve Lutensol™XL90 in base BSD. All the solutions presented a separation within a minute (FIG. 1).

TABLE 2

Compositions for dissolving Lutensol ™ XL90 in base BSD with TRITON ™ H-55

| Base BSD, mL | H-55, μL | Lutensol XL90, μL | Observations: H-55 is soluble in base BSD |
|---|---|---|---|
| 10 | 20 | 20 | separation |
| 10 | 50 | 20 | separation |
| 10 | 100 | 20 | separation |
| 10 | 200 | 20 | separation |

Plurafac™ CS-10

Figure 2:
FIG. 2 is a photograph showing Lutensol® XL90 dissolved in a barium scale dissolver (base BSD) with Plurafac CS-10.

Plurafac™ CS-10 is anionic polycarboxylate surfactant that is soluble in high alkaline solutions such as base BSD. However, none of the concentrations of Plurafac™ CS-10 tested in Table 3 can dissolve Lutensol™ XL90 in base BSD. All of the solutions presented a phase separation within a minute (FIG. 2).

TABLE 3

Compositions for dissolving Lutensol ™ XL90 in base BSD with Plurafac ™ CS-10

| Base BSD, mL | Plurafac CS-10, μL | Lutensol XL90, μL | Observations: Plurafac CS-10 is soluble in base BSD |
|---|---|---|---|
| 10 | 20 | 20 | separation |
| 10 | 50 | 20 | separation |
| 10 | 100 | 20 | separation |
| 10 | 200 | 20 | separation |

Sodium Xylene Sulfonates (SXS)

Figure 3:
FIG. 3 is a photograph showing Lutensol® XL90 dissolved in a barium scale dissolver (base BSD) with DOWFAX™ C6L.

Sodium Xylene Sulfonates (SXS) is a commonly used hydrotrope to solubilize surfactants. However, it is well known that SXS is not highly efficient to dissolve high concentration of nonionic alkoxylate such as Lutensol™ XL90 in high alkaline solutions. The data presented in Table 4 (and as seen in FIG. 3) shows that a very high concentration of SXS is required to dissolve Lutensol™ XL90 in base BSD forming clear homogenous stable solution with no separation.

TABLE 4

Compositions for dissolving Lutensol ™ XL90 in base BSD with SXS

| Base BSD, mL | SXS, μL | Lutensol ™ XL90, μL | Observations: SXS is soluble in base BSD |
|---|---|---|---|
| 10 | 50 | 20 | separation |
| 10 | 100 | 20 | separation |
| 10 | 200 | 20 | separation |
| 10 | 500 | 20 | separation |

TABLE 4-continued

Compositions for dissolving Lutensol ™ XL90 in base BSD with SXS

| Base BSD, mL | SXS, µL | Lutensol ™ XL90, µL | Observations: SXS is soluble in base BSD |
|---|---|---|---|
| 10 | 700 | 20 | separation |
| 10 | 1000 | 20 | Clear homogenous solution (stable, no separation) |

Armoclean™ 6040 Hexyl Glucoside

Figure 4:
FIG. 4 is a photograph showing Lutensol® XL90 dissolved in a barium scale dissolver (base BSD) with Armoclean 6040 Hexyl Glucoside.

Armoclean™™ 6040 Hexyl Glucoside is a very efficient hydrotrope to solubilize surfactants. It is highly efficient to dissolve a high concentration of nonionic alkoxylate such as Lutensol™ XL90 in high alkaline solutions. The required concentration of Armoclean™ 6040 Hexyl Glucoside to dissolve Lutensol™ XL90 in base BSD is almost 5 times lower than that required of SXS (Table 5, FIG. 4).

TABLE 5

Compositions for dissolving Lutensol ™ XL90 in base BSD with Armoclean ™ 6040 Hexyl Glucoside

| BASE BSD, mL | Hexyl Glucoside, µL | Lutensol XL90, µL | Observations: Hexyl Glucoside is soluble in base BSD |
|---|---|---|---|
| 10 | 20 | 20 | separation |
| 10 | 50 | 20 | separation |
| 10 | 100 | 20 | separation |
| 10 | 125 | 20 | separation |
| 10 | 150 | 20 | separation |
| 10 | 175 | 20 | Clear homogenous solution (stable, no separation) |
| 10 | 200 | 20 | Clear homogenous solution (stable, no separation) |

The above results indicate that above a certain threshold concentration, the hexyl glucoside component will allow maintaining the BSD composition stable (i.e. prevent it from separating) during the length of the monitoring. To note, neither TRITON® H-55 nor Plurafac® CS-10 used in the same concentration was capable of preventing the composition from separating.

Armoclean 6000 (AG6202) Octyl Glucoside

Figure 5:
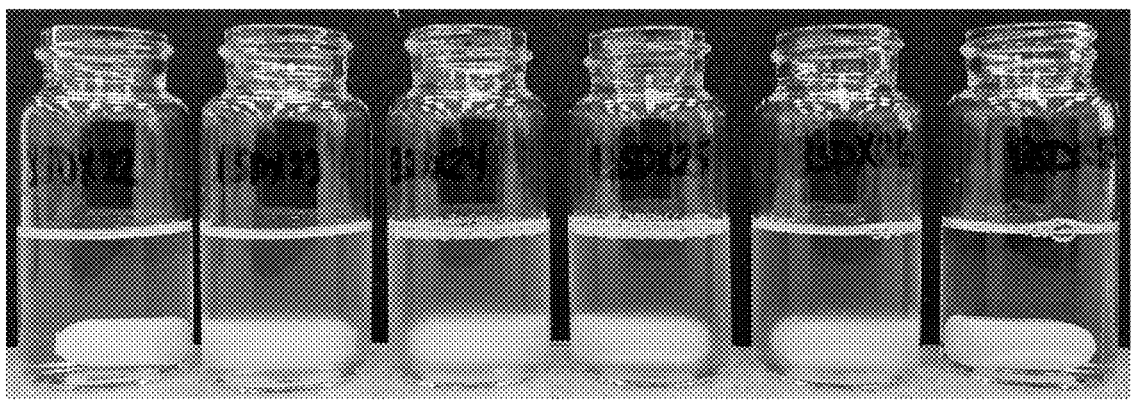
FIG. 5 is a photograph showing Armoclean® 6000 (AG6202) Octyl Glucoside dissolved in a barium scale dissolver (base BSD)

Interestingly, Armoclean™ 6000 (AG6202) in base BSD presents a unique phase behavior compared to Armoclean™ 6040 (Table 6, FIG. 5). At low concentration, Armoclean™ 6000 (AG6202) forms a clear solution when added to base BSD. However, as the concentration of Armoclean™ 6000 (AG6202) increased the solution became turbid. At high concentration of Armoclean™ 6000, the solution became clear. Turbidity means that the surfactant is unstable in the solution and presents in the form of large flocs.

More interestingly, when Lutensol™ XL90 was added to the solutions of Armoclean™ 6000 (AG6202) in base BSD, some of the samples with intermediate concentrations and the samples with high concentrations of Armoclean™ 6000 (AG6202) became clear solutions, though samples with a low concentration of Armoclean™ 6000 (AG6202) became a turbid solution. It is worth mentioning that Lutensol™ XL90, on its own, is not soluble over long periods of time in base BSD as it phase separates over a few days and at slightly elevated temperatures.

Figure 6:
FIG. 6 is a photograph of a Compatibility testing with a barium scale dissolver (base BSD) (with Lutensol® XL-90) and AG-6202 at varying loadings at room temperature.

This points to a heretofore unknown synergistic interaction between the Lutensol XL90 and Armoclean™ 6000 (AG6202) that leads to the formation of a clear solution above a certain threshold of Armoclean™ 6000 (AG6202) for a specific concentration of Lutensol™ XL90 (FIG. 6). This threshold of Armoclean™ 6000 (AG6202) would vary depending on the concentration of Lutensol™ XL90

Compared to Armoclean™ 6040 Hexyl Glucoside, Armoclean™ 6000 (AG6202) Octyl Glucoside has a lower threshold for dissolving a specific concentration of Lutensol XL90 in base BSD.

TABLE 6

Compositions for dissolving Lutensol ™ XL90 in base BSD with Armoclean ™ 6000 (AG6202) Octyl Glucoside

| Sample # | BASE BSD, mL | Octyl Glucoside, µL | Lutensol XL90, µL | Observations: After adding Armoclean 6000 | Observations: After adding Lutensol XL90 |
|---|---|---|---|---|---|
| BSDX22 | 10 | 20 | 20 | Clear solution | Turbid/Separation |
| BSDX23 | 10 | 50 | 20 | Turbid solution | Turbid/Separation |
| BSDX24 | 10 | 100 | 20 | Turbid solution | Clear solution |
| BSDX25 | 10 | 150 | 20 | Turbid solution | Clear solution |
| BSDX26 | 10 | 175 | 20 | Turbid solution | Clear solution |
| BSDX27 | 10 | 200 | 20 | Clear solution | Clear solution |

Surface Tension and Contact Angle Measurements for Armoclean™ 6000 (AG6202) Octyl Glucoside with Lutensol™ XL90 in BASE BSD The surface tension and contact angle of various compositions comprising the base BSD and Armoclean™ 6000 Octyl Glucoside with Lutensol™ XL90 were measured using Wilhelmy plate method and presented below.

Surface Tension Measurements

The surface tension (SFT) of each composition was measured using a Wilhelmy plate with a Kruss 100C force tensiometer.

Dynamic Contact Angle Measurements

Dynamic contact angle measurements were conducted using the Wilhelmy plate method with a Kruss 100C force tensiometer. A parafilm plate was used as a hydrophobic surface to measure the efficiency of the formulations in reducing the contact angles. The advancing and receding contact angles ($\theta A$ and $\theta R$) were measured. They are indicative of how efficient the formulation can change the wettability of a hydrophobic surface to be more water-wet for easier cleaning of the surfaces. The advancing angles ($\theta_A$) is always higher than the receding contact angles ($\theta R$) as the plate advances in the fluid dry. But while receding, the molecules were already oriented at the surface.

As shown in Table 7, the synergy between Lutensol™ XL90 and Armoclean™ 6000 (AG6202) can reduce the surface tension and the contact angles significantly. This allows for efficient penetration of the deposited scales.

TABLE 7

Surface Tension and Contact Angle Measurements for dissolving Lutensol XL90 in base BSD with Armoclean ™ 6000 (AG6202) Octyl Glucoside

| Sample # | Density, g/mL | SFT, mN/m | $\Theta_A$, ° | $\Theta_R$, ° |
|---|---|---|---|---|
| DIW | 0.998 | 72.3 | 115 | 90 |
| Base BSD | 1.148 | 31.9 | 57.96 | 29.55 |
| BSDX24 | 1.148 | 28.63 | 46.83 | 15.46 |
| BSDX25 | 1.148 | 28.26 | 40.8 | 16.07 |
| BSDX26 | 1.148 | 27.98 | 39.16 | 14.09 |
| BSDX27 | 1.148 | 27.71 | 37.02 | 13.85 |

Lower contact angles indicate a more effective wetting to penetrate the petroleum layers embedded in the scale exposing the scale and, consequently an improvement in the dissolution of the scale.

Figure 7:
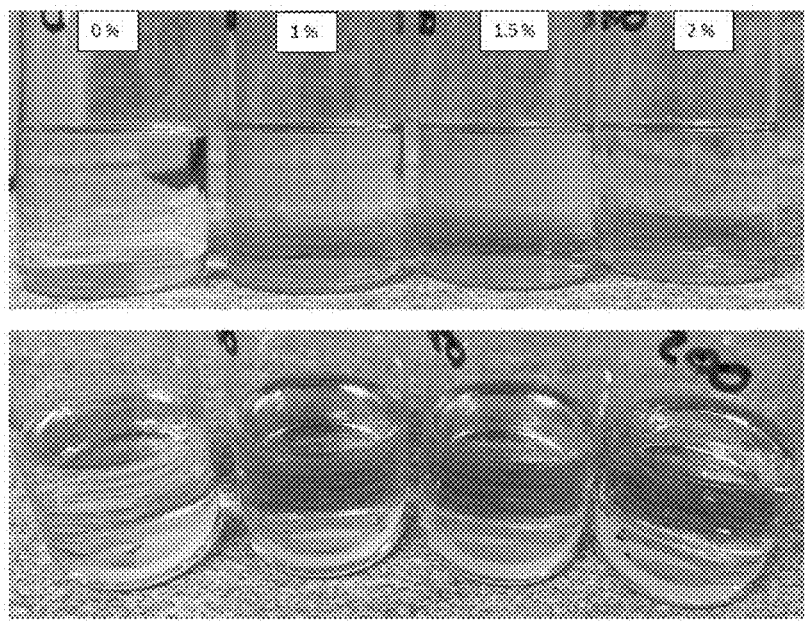
FIG. 7 is a photograph of a Compatibility testing with a barium scale dissolver (base BSD) (with Lutensol® XL-90) and AG-6202 at varying loadings after 7 days in a water bath at 35° C.

Compatibility Testing Laboratory Testing for Armoclean™ 6000 (AG6202) Octyl Glucoside with Lutensol™ XL90 in BASE BSD Summary Compatibility testing was performed to determine the stability of Lutensol™ XL90 at a 0.2% loading in base BSD. To increase the stability of Lutensol™ XL90 a co-surfactant was added, AG 6202 (FIG. 7). AG 6202 was added at varying concentrations (from 0 to 2% v/v) in base BSD containing 0.2% Lutensol™ XL90 and placed in either a water bath set to 35° C. or benchtop conditions of 20° C. and monitored over 2 weeks. Photos were taken after 1 week and 2 weeks to determine if any incompatibility or chemical separation was observed in the blend.

Procedure

A blend of base BSD containing 0.2% Lutensol™ XL90 was made and divided into 10 mL testing vials. The AG 6202 was then dosed in at 0, 1%, 1.5% or 2% (v/v). A set of these containers was either placed on the benchtop at ambient temperature (approx. 20.0° C.), or in a water bath (35° C.). The containers were observed and none of them displayed any signs of separation after 1 week. They were re-evaluated after another week and none of them displayed any signs of separation.

Basoclean™ 80 ($C_8$-$C_{12}$ Alkyl Glucoside)

Figure 8:
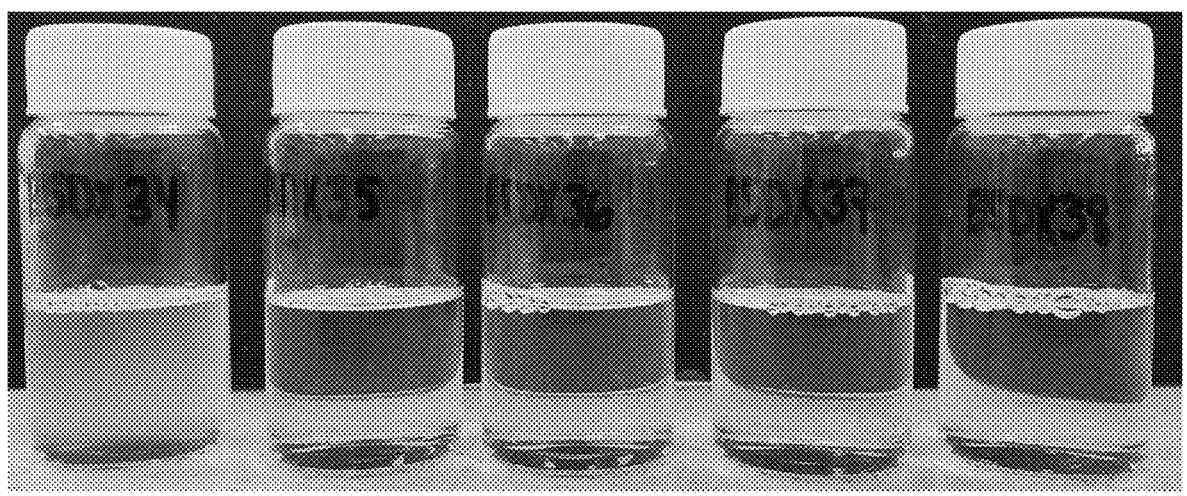
FIG. 8 is a photograph of a Compatibility testing with a barium scale dissolver (base BSD) (with Lutensol® XL-90) and Basoclean™ 80.

Basoclean™ 80 is another hydrotrope that is octyl-decyl alkyl glucoside. It was added to base BSD at different concentrations (Table 8). It is soluble in the base BSD at all different loadings. Lutensol™ XL90 was then added to the base BSD/Basoclean™ 80 solutions (Table 8). It was found that Basoclean™ 80 is working more effectively than other hydrotropes tested before. It is pushing the lower threshold for stability to 0.44 vol %. The threshold loading of Basoclean™ 80 to solubilize Lutensol™ XL90 in base BSD is 2.5 times the concentration of Lutensol™ XL90. FIG. 8 shows the resulting solutions of base BSD containing dissolved Lutensol™ XL90 with varying amounts of Basoclean™ 80.

TABLE 8

Compositions for dissolving Lutensol ™ XL90 in BSD-40 with Basoclean ™ 80

| Sample # | BSD (mL) | Basoclean ™ 80 (g) | Basoclean ™ 80 (µL) | Lutensol ™ XL90 (µL) | Observations: After adding Basoclean ™ 80 | Observations: After adding Lutensol ™ XL90 |
|---|---|---|---|---|---|---|
| BSDX34 | 10 | 0.02 | 18 | 20 | Clear solution | Turbid/Separation |
| BSDX35 | 10 | 0.05 | 44 | 20 | Clear solution | Clear solution |
| BSDX36 | 10 | 0.10 | 88 | 20 | Clear solution | Clear solution |
| BSDX37 | 10 | 0.15 | 133 | 20 | Clear solution | Clear solution |
| BSDX38 | 10 | 0.20 | 177 | 20 | Clear solution | Clear solution |

According to a preferred embodiment of the present invention, there is provided a one-step process for removing petroleum-contaminated barium sulfate scale inside a wellbore, said process comprising the following steps:
  providing a liquid composition comprising:
    a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
    a scale removal enhancer;
    a non-ionic surfactant; and
    a hydrotrope;
  exposing a surface contaminated with petroleum-contaminated barium sulfate scale to the liquid composition;
  allowing sufficient time of exposure to remove some or all of the petroleum-contaminated barium sulfate scale from the contaminated surface. The person skilled in the art will understand that what is meant by "one-step" is that there is a single treatment step in the process (or method) to remove barium sulfate scale.

According to a preferred embodiment of the present invention, there is provided a one-step process for removing petroleum-contaminated barium sulfate scale inside a wellbore, said process consisting of the following steps:
  providing a liquid composition comprising:
    a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
    a scale removal enhancer;
    a non-ionic surfactant; and
    a hydrotrope;
  exposing a surface contaminated with petroleum-contaminated barium sulfate scale to the liquid composition;
  allowing sufficient time of exposure to remove some or all of the petroleum-contaminated barium sulfate scale from the contaminated surface. The person skilled in the art will understand that what is meant by "one-step" is that there is a single treatment step in the process (or method) to remove barium sulfate scale.

When the surface equipment is contaminated with barium sulfate scale, or it is deep underground or a hard to access tubing or piping or a combination thereof, the typical treatment exposure consists of circulating or agitating the liquid composition through the tubing or piping until it has been established that the scale has been removed beyond a desirable predetermined point. Hence, in some cases, it is quite possible that the entirety of the scale present is not removed but the resultant removal is sufficient to re-start operations and provide the desired productivity and/or circulation through the affected tubing/piping. The liquid composition can also be heated to improve the removal of the scale and the speed at which the removal is effected and also utilized in conjunction with mechanical intervention methods to further increase effectiveness.

According to another preferred embodiment of the present invention, the method of treatment of petroleum-contaminated $BaSO_4$ scale wherein the fluid is spotted, i.e. placed in a tube/tank/pipe/equipment in a soaking operation. This may in some instances be somewhat less efficient than circulating the fluid due to the surface reaction nature of the fluid, but it is utilized in some cases to remove enough scale to run tools and also mechanically intervene to achieve the desired result, as an example.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. An aqueous composition for use in removing petroleum-contaminated barium sulfate scale from a surface contaminated with the same, said composition comprising:
 a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
 a scale removal enhancer;
 a non-ionic surfactant; and
 a hydrotrope,
 wherein the composition has a pH ranging from 10 to 11.

2. The aqueous composition according to claim 1, wherein the hydrotrope is selected from the group consisting of: alkyl glucosides and alkyldiphenyloxide disulfonates.

3. The aqueous composition according to claim 2, wherein the alkyldiphenyloxide disulfonate is Disodium Hexyl Diphenyl Ether Disulfonate.

4. The aqueous composition according to claim 2, wherein the alkyl glucoside is a $C_6$-$C_{12}$ alkyl glucoside.

5. The aqueous composition according to claim 1, wherein the hydrotrope is a $C_6$-$C_{12}$ alkyl glucoside selected from the group consisting of: hexyl glucoside; octyl glucoside; decyl glucoside; dodecyl glucoside and combinations thereof.

6. The aqueous composition according to claim 1, wherein the scale removal enhancer is selected from the group consisting of: potassium carbonate; potassium formate; cesium formate; cesium carbonate; and combinations thereof.

7. The aqueous composition according to claim 1, wherein the non-ionic surfactant is selected from the group consisting of: linear alcohol ethoxylate surfactants and branched alcohol ethoxylate surfactants.

8. The aqueous composition according to claim 1, wherein the non-ionic surfactant is a linear alcohol ethoxylate surfactant selected from the group consisting of: alcohol ethoxylate surfactants having a chain length of at least 6 carbon atoms.

9. The aqueous composition according to claim 1, wherein the scale removal enhancer is present in the composition in an amount ranging from 5 to 20 wt % of the composition.

10. The aqueous composition according to claim 1, wherein the chelating agent and counterion are present in the composition in an amount ranging from 5 to 40 wt % of the composition.

11. The aqueous composition according to claim 1, wherein the scale removal enhancer is selected from the group consisting of: $K_5DTPA$; $Cs_5DTPA$; $Na_4EDTA$; and $K_4EDTA$.

* * * * *